M. B. DIMIN.
VEHICLE FENDER.
APPLICATION FILED JULY 29, 1920.

1,392,625.

Patented Oct. 4, 1921.
2 SHEETS—SHEET 1.

Inventor:
Morris B. Dimin,
By his Attorney

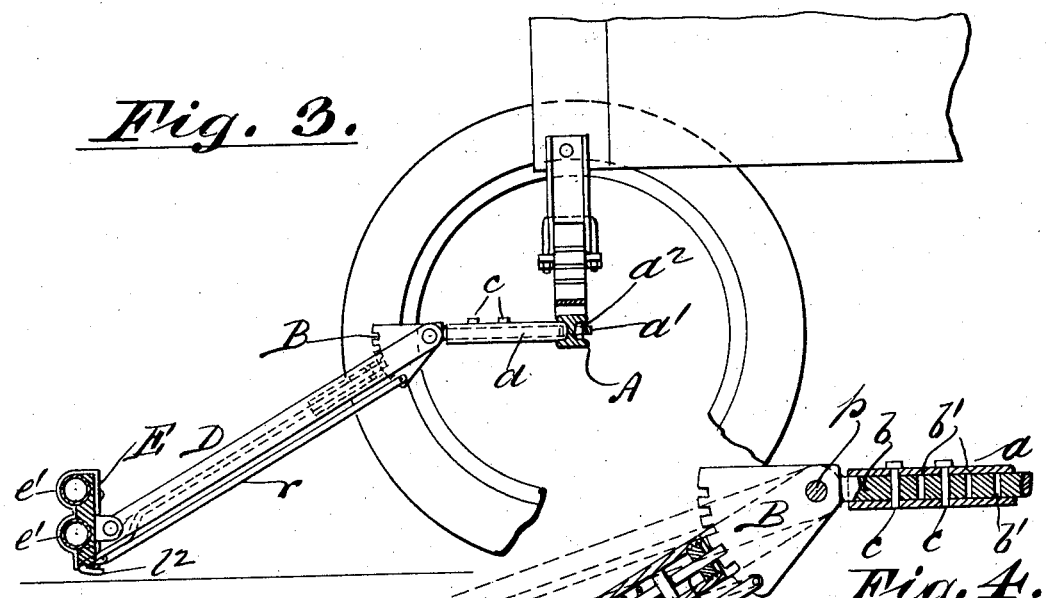

UNITED STATES PATENT OFFICE.

MORRIS B. DIMIN, OF BROOKLYN, NEW YORK.

VEHICLE-FENDER.

1,392,625.     Specification of Letters Patent.     Patented Oct. 4, 1921.

Application filed July 29, 1920. Serial No. 399,870.

*To all whom it may concern:*

Be it known that I, MORRIS B. DIMIN, a citizen of the United States, and a resident of the borough of Brooklyn, county of Kings, city and State of New York, have invented certain new and useful Improvements in Vehicle-Fenders, of which the following is a specification.

While applicable to other vehicles, my improvements are designed primarily and particularly for use upon automobiles,—the object being to afford a frontal fender which may be conveniently and expeditiously raised and lowered in position; and which affords adequate protection against injury to persons or objects accidentally contacting therewith,—the invention consisting in the specific construction and arrangement of parts described and claimed, and distinctive features relating to the means of adjustment, the provision of duplex buffer contacts, the maintenance of the same in vertical alinement irrespective of adjustment, etc., all as hereinafter fully set forth.

In the accompanying drawings,

Fig. 3, is a section taken upon plane of line 3—3, Fig. 1;

Fig. 4, is an enlarged sectional detail of one of the vertically adjustable bracket arms, its horizontally adjustable bracket, etc.;

Fig. 5, is a top view in detail of the bracket shown in Fig. 4;

Fig. 6, is a front view of the buffer, broken away in part;

Fig. 7, is a sectional detail showing a modification in the means of attaching the segmental brackets to the axle.

Figure 1:
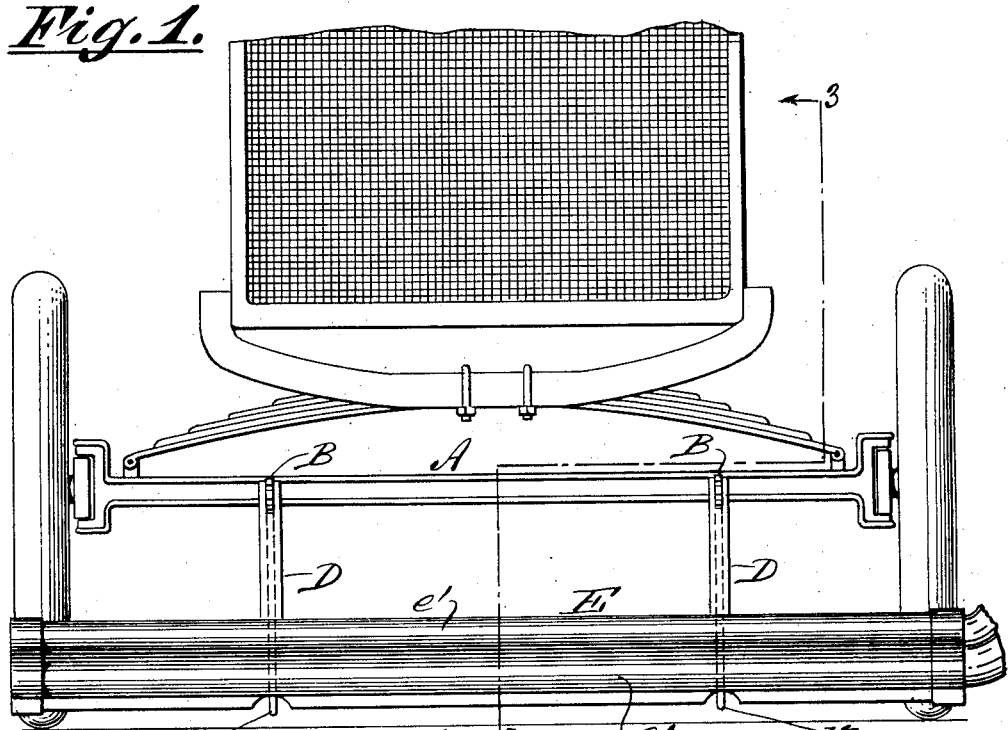
Figure 1, is an elevation of the front end of an automobile equipped with my improved fender.
Figure 2:
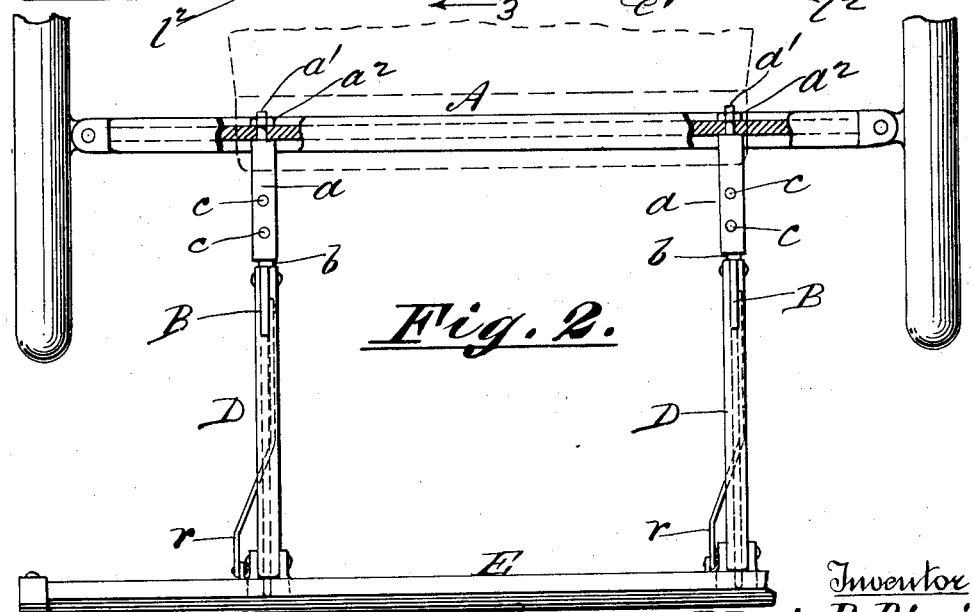
Fig. 2, is a top view of the fender and connections, broken away in part.

A, represents the front axle of an automobile upon which my improved fender is preferably mounted, although it may be otherwise supported on the chassis of the machine if so desired.

The main novelty of my improved fender consists in its adjustability both horizontally and vertically, and both these results may obviously be attained by means of various mechanical expedients, so that I do not confine myself to the identical form and disposition of parts herein shown, since modifications may be resorted to without departing from the spirit and intent of my invention in this respect,—the essentials in this connection being horizontally adjustable bracket supports upon the front axle or chassis, and buffer supporting arms which are vertically adjustable upon said bracket supports substantially as herein set forth.

With this understanding, B, B, represent segmental brackets, formed with shanks $b$, $b$, which are adjustably supported in sockets $a$, $a$, rigidly attached to the axle A, or other relatively fixed part of the frame of the machine. Any suitable mechanical expedient may be resorted to in thus rigidly attaching the supporting sockets $a$, $a$, upon the axle A, or equivalent part. In the drawings the said supporting sockets $a$, $a$, are shown as formed with rear screw studs $a'$, $a'$, passing through and secured to the axle A, by nuts $a^2$, $a^2$, or any other form of clamping device may be substituted with like result.

The bracket shanks $b$, $b$, are formed each with a series of coupling pin holes $b'$, $b'$, as shown more particularly in Fig. 4, of the drawings, and coupling pins $c$, $c$, are used as indicated therein to lock the shanks adjustably in said supporting sockets $a$, $a$. For instance, in said Fig. 4, the segmental bracket B, and its shank $b$, are shown as in fully retracted position. When it is desired to adjust the bracket B, outward the coupling pins are withdrawn temporarily, the bracket advanced, as desired, and the coupling pins $c$, $c$, inserted in the correspondingly advanced holes $b'$, $b'$, of the shank $b$. In Fig. 7, I show an alternative method of attaching the socket pieces $a$, to the axle A, consisting in forming said sockets with rear flanges $a^x$, $a^x$, which straddle the axle A, and are clamped thereto by a bolt $b^x$—thus obviating the necessity for weakening the axle in order to insert a bolt.

Fulcrumed on each of the segmental brackets B, by means of a pivot $p$, is a buffer-supporting arm D, the outer end of which is pivotally attached to the rear side of the buffer bar E, which is also pivotally connected with the segmental bracket B, by a compensating rod $r$, which maintains the buffer bar E, in upright position under all conditions of vertical adjustment thereof as indicated by dotted lines in Fig. 4. The front edge of the segmental bracket B, is concentric with the pivot $p$, and is formed with a series of rack teeth or notches $b^2$, $b^2$, for engagement with the inner end of a latch rod $l$, as shown more particularly in Fig. 4,—said latch rod $l$, being held in engagement with the segmental rack B, by a spring $s$, interposed between a shoulder $l'$, on the latch rod $l$, and the end of the recess $d$, in which it is confined in the supporting arm D. The latch rod $l$, extends through the supporting arm D, to the lower portion of the buffer bar E, which is formed with a recess $e$, to afford access to the handle $l^2$, of the latch rod $l$, whereby the latter may be retracted against the resistance of the spring $s$, to unlock the supporting arm D, for the purpose of raising or lowering the buffer bar E. The above description applies of course to each bracket B, and supporting arm D, two of which are shown in the drawings, although any plural number may be provided for the adjustable support of the buffer bar E, as may be found most expedient.

The buffer bar E, is preferably furnished with duplex tubular buffer cushions $e'$, $e'$, shown in transverse section in Figs. 3 and 4, or any other form of contactual cushion may be used upon said buffer bar E.

It will be seen that by my invention I am enabled to effect independently either the horizontal or vertical adjustment of the buffer bar E. By this means I am enabled to adapt the fender readily to vehicles of various kinds and sizes, and to adjust the parts to the varying exigencies of use. Furthermore the buffer bar E, may be conveniently and expeditiously raised and retracted when not required for use, as when in the garage, or where economy of space is essential, or advanced and lowered for traffic. In so far as the raising and lowering of the fender is concerned this may be accomplished readily from the front of the buffer bar E, as while the latch lever handles $l$, $l$, are protected from contact with extraneous objects by their position under said buffer bar E, they are readily accessible for hand manipulation.

By the use of the compensating bar $r$, I maintain the buffer bar E, vertically upright irrespective of its adjustment in height, so that it is always in the most advantageous position for meeting and counteracting shock in case of accidental contact with persons or objects extraneous to the machine.

What I claim as my invention and desire to secure by Letters Patent is,

1. In combination with a vehicle fender of the character designated, means for effecting the vertical adjustment of the buffer bar comprising segmental brackets secured to a fixed part, buffer bar supporting arms pivotally connected with said brackets and with the buffer bar, said buffer bar, and retractile latch means for coupling the supporting arms to the segmental brackets, for the purpose described.

2. In combination with a vehicle fender of the character designated, means for effecting the vertical adjustment of the buffer bar comprising segmental brackets secured to a fixed part, buffer bar supporting arms pivotally connected with said brackets and with the buffer bar, said buffer bar, compensating bars pivotally attached to the said bracket arms and to the buffer bar, and retractable latch means for coupling the supporting arms to the segmental brackets, for the purpose described.

3. A vehicle fender of the character designated, comprising a buffer bar furnished with duplex tubular buffer cushions positioned one above the other, supporting arms pivotally connected with said buffer bar and with fixed segmental brackets, said segmental brackets, and retractable latch means positioned in said supporting arms and engaging the segmental brackets, for the purpose described.

4. A vehicle fender of the character designated, comprising a buffer bar furnished with duplex tubular buffer cushions positioned one above the other, supporting arms pivotally connected with said buffer bar and with fixed segmental brackets, said segmental brackets, retractable latch means positioned in said supporting arms and engaging with said segmental brackets, and compensating bars pivotally attached to said bracket arms and to the buffer bar, for the purpose described.

MORRIS B. DIMIN.

Witnesses:
  Geo. Wm. Miatt,
  Dorothy Miatt.